Figure 1:
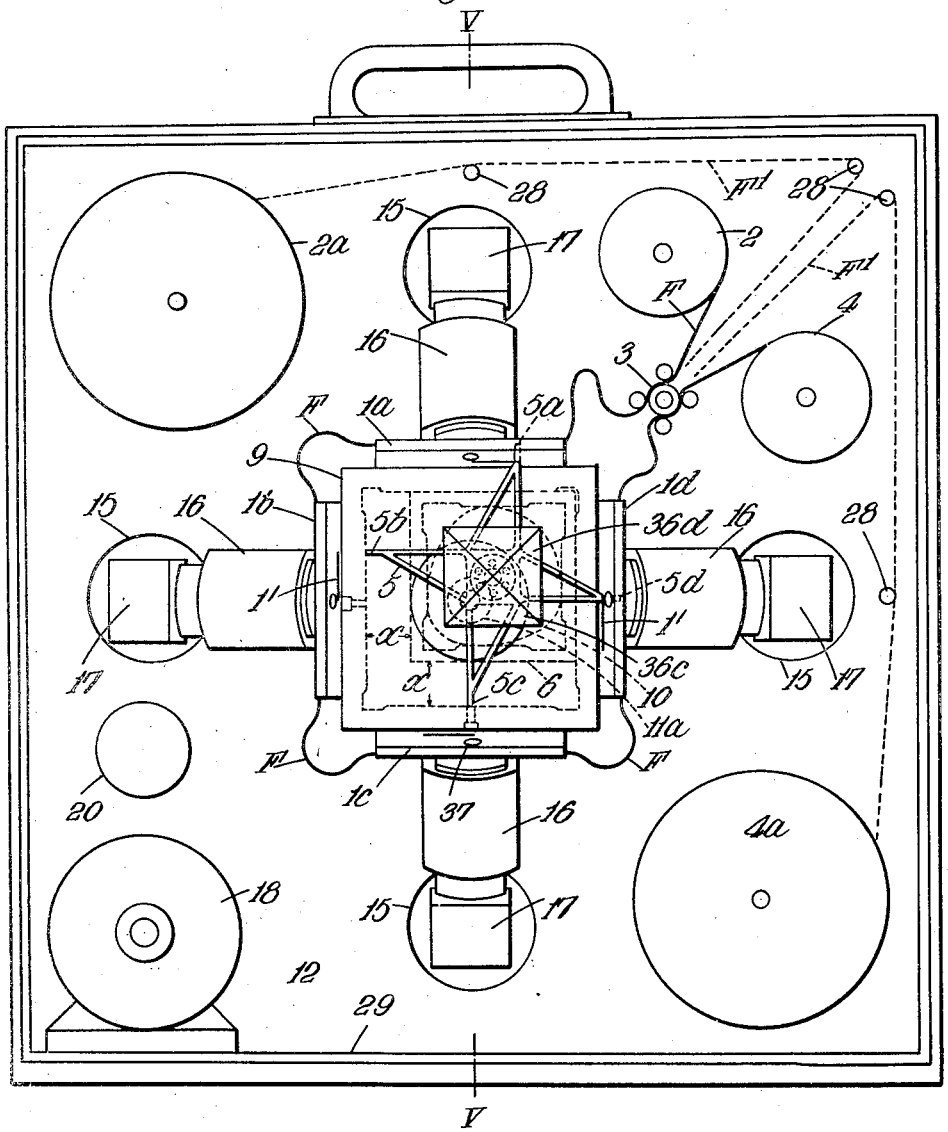

Nov. 21, 1933.   B. E. LUBOSHEZ   1,936,114
CINEMATOGRAPH APPARATUS AND MECHANISM THEREFOR
Filed Jan. 21, 1933   3 Sheets-Sheet 1

INVENTOR
B. E. LUBOSHEZ

Nov. 21, 1933.  B. E. LUBOSHEZ  1,936,114
CINEMATOGRAPH APPARATUS AND MECHANISM THEREFOR
Filed Jan. 21, 1933  3 Sheets-Sheet 2

INVENTOR
B. E. LUBOSHEZ
By Fetherstonhaugh & Tansley
Att'ys

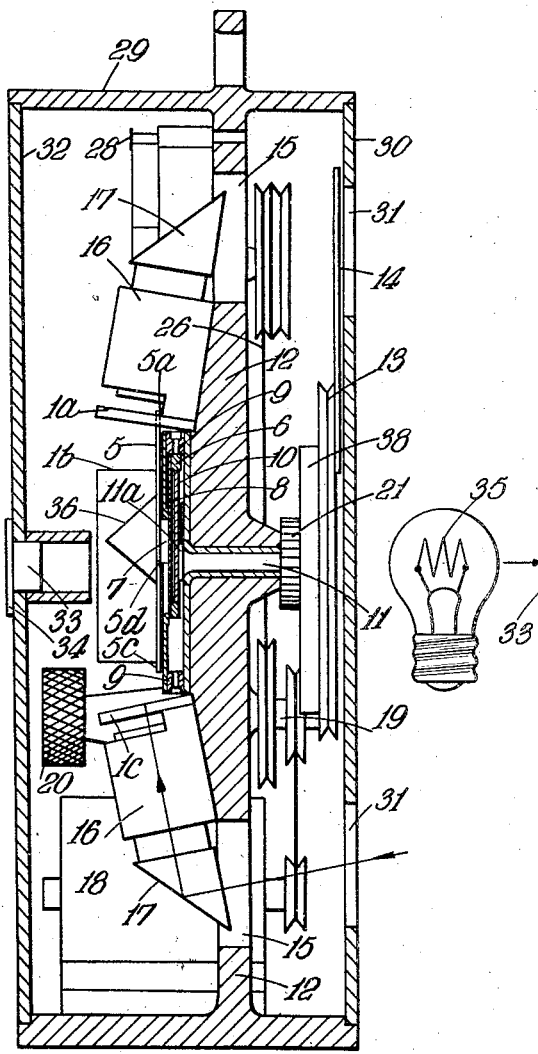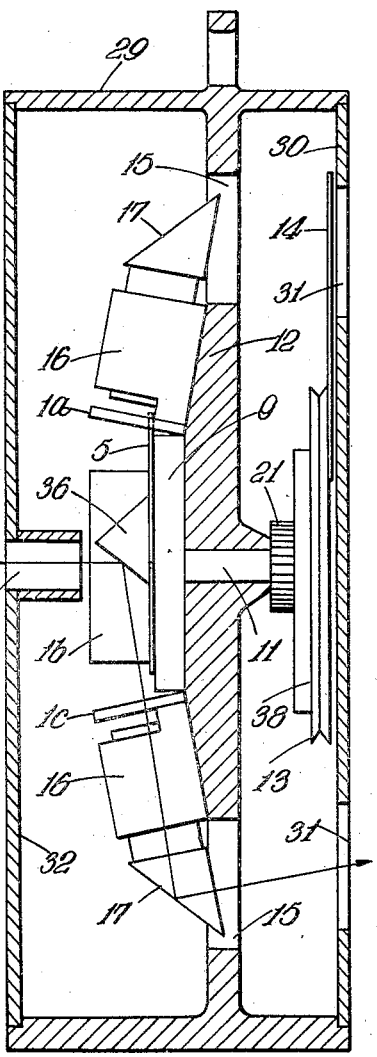

Patented Nov. 21, 1933

1,936,114

UNITED STATES PATENT OFFICE 1,936,114

CINEMATOGRAPH APPARATUS AND MECHANISM THEREFOR

Benjamin Ellan Luboshez, Harrow, England

Application January 21, 1933, Serial No. 653,034, and in Great Britain January 21, 1932

8 Claims. (Cl. 88—16.6)

The present invention relates to that type of cinematograph apparatus wherein a plurality of series of images are taken and projected alternately whereby the whole of the available time is used for exposure, in some cases the exposures overlapping. An example of this type of apparatus is illustrated in my patent specification Serial No. 540,119 filed May 26, 1931. In that case, in order to keep the lenses as close together as possible, they are arranged in a ring on the inside of the film track, but in the cases where a flat surface forms the object taken, as for example, an X-ray screen, for which purpose this type of apparatus is almost exclusively used, the arrangement of the lenses at greater distances apart is of no consequence, in which case their location outside the film track permits of a very great simplification of the mechanism, whilst a further advantage lies in the possibility of using a single illumination source for all the exposure series, located within the space bounded by the film track, when the apparatus is used as a projector.

The present invention consists in a mechanism for this purpose. By also producing the images for each series several pictures apart on the film whereby the series are inter-located, any length of film may be run through the apparatus continuously, thereby avoiding the limitation to a series of very short duration. This is rendered possible by the use of a device, forming a feature of this invention, which causes a point to follow a square locus. With the usual type of film claw operating mechanism, even if the claw is made to move in an elliptical path or in a D path, there is a limit to the travel obtainable imposed by the necessity for avoiding appreciable movement of the claw transverse to the film and for keeping down to a minimum the distance the claw projects through the perforation. If, as is the case with a mechanism according to this invention, the claw tip follows a square locus, it may be caused just to enter a perforation when reaching the end of one side of the square, thence to travel in the direction of the film without movement relative thereto any distance determined by the size of the square, finally to leave the perforation perpendicularly to the film when commencing to traverse the next side of the square.

Where 4 lenses are used they can be arranged around a square film track, when all four film claws can be operated simultaneously by one mechanism, all claws being mounted at right angles on a common frame or operated carrier. Thus one claw will be moving a section of film behind the closed lens whilst the other three claws are inoperative and their corresponding film sections stationary and exposing. The operative claw will be travelling in a straight line along one side of its square path, the others travelling identically along parallel lines, the first perpendicularly entering a perforation in the film section next to be moved just at the end of its travel (this section being at right angles to that under motion, as it is along the next side of the square track), the next claw travelling on its return stroke, and the last leaving a perforation perpendicularly as it commences its stroke. The same cycle is repeated one claw ahead as they all are moved identically along parallel lines forming the next sides of their square loci.

In this manner the whole of the motion of the claw-operating mechanism is utilized and none wasted on idle return strokes, and this tends to evenness of driving torque.

Figure 2:
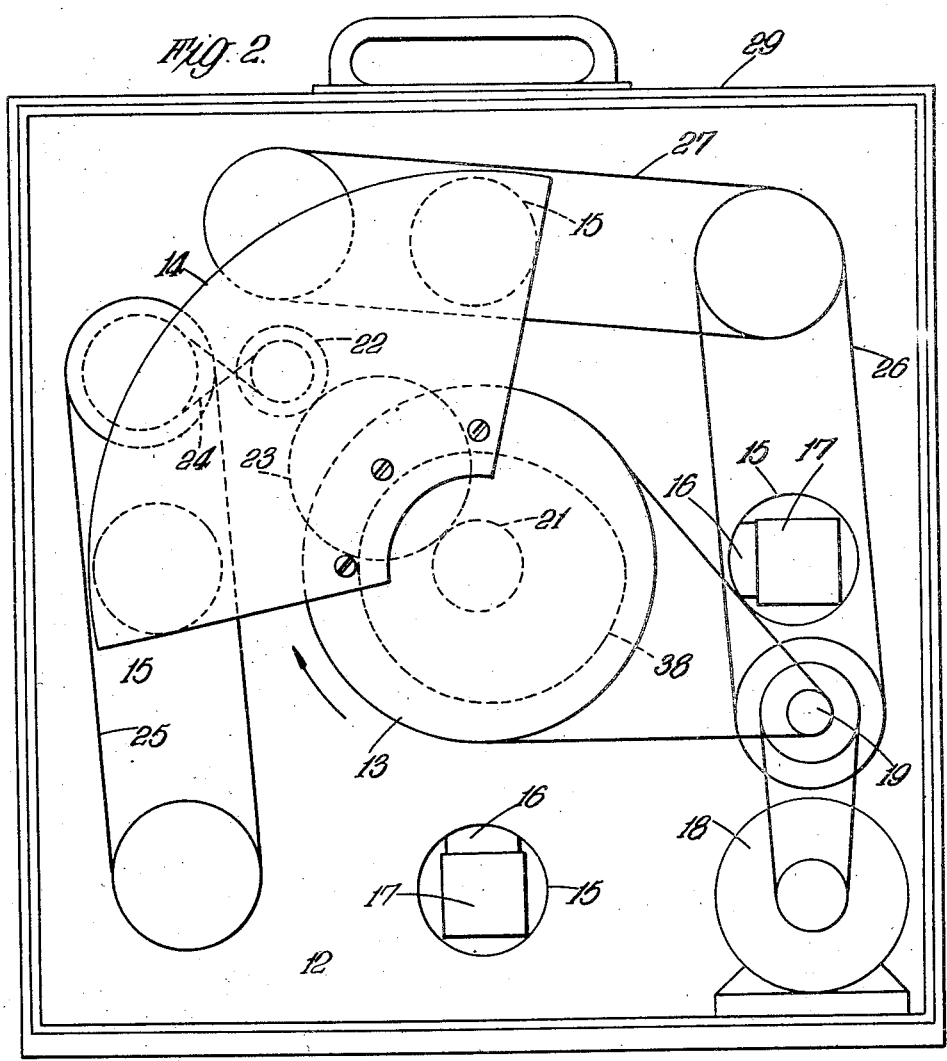
Figure 3A:
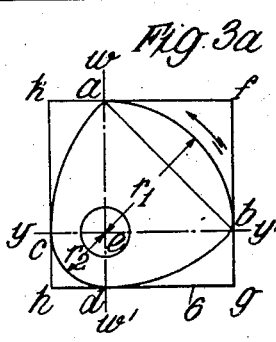
Figure 3B:
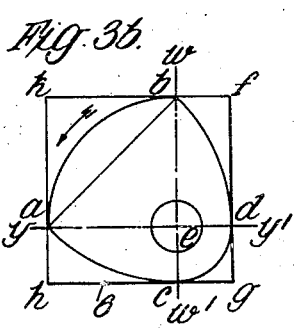
Figure 4:
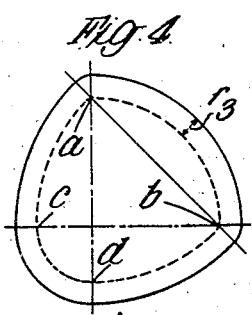

The mechanism for performing the above operation is illustrated in the accompanying drawings as applied to a 4-lens camera for producing four series of exposures in one line along the film, the film being moved at each gate four image spaces at a time. The drawings also illustrate a convenient construction of camera to incorporate the invention. In these drawings, Fig. 1 is a rear elevation of cinematograph apparatus with the case cover removed, as seen in the taking or projecting direction, and Fig. 2 is a front elevation of this apparatus as seen in the opposite direction to Fig. 1; Figs. 3a and 3b are diagrams of two positions of a special cam hereinafter referred to, and Fig. 4 is a modification thereof. Fig. 5 is a vertical section on line V—V of Fig. 1 showing certain parts in elevation and showing the path of light when in use as a camera, and Fig. 6 is a similar view to Fig. 5 showing the path of light when in use as a projector, and only so much detail as is necessary for identification purposes.

With a view to explaining the purpose of the film operating apparatus in accordance with the invention, reference will first be made to Fig. 1 which shows a film track lying in sections 1a—1d substantially on the four sides of a square. During exposure the film F is led from a spool 2 over one side of a sprocket 3 with guide rollers in known manner, counter-clockwise along the track 1a—1d in succession, and over the other side of the sprocket 3 to the take-up spool 4. The same operating mechanism is arranged to move the film through each gate in succession and to this end four film claws 5a—5d spaced equidistant are carried by a frame 5. Slots 1' are provided in the film track 1a—1d to accommodate the claws each of which, when it reaches the end of one side of its square path, enters one end of a slot and protrudes just sufficiently to enter a film perforation, then passes along the slot without relative movement transverse to the film whilst traversing the next side of its path, and finally leaves the perforation on the centre line of the image when commencing the next side of its path.

The frame 5 is caused to follow a square locus, thus causing each claw to follow a square locus also. For this purpose it is mounted on a hollow square frame 6 by means of a boss 7 connecting the frame 5 with a plate 8 covering the frame 6 (see Fig. 5), and the frame 6 is slid in succession along the internal sides of a surrounding square frame 9 by means of a cam 10 rotating within the square 6.

The shape of this cam, which forms a feature of the present invention, is such that it always touches all four of the internal sides of the square 6 as illustrated diagrammatically in Fig. 3. The cam is divided into four equal angular portions, two diametrically opposite $ab$ and $cd$ having concentric radii $r_1$ and $r_2$ respectively, the difference $x$ between which is the distance which the film has to be moved at each gate, i. e. the length of the side of the square locus and the difference between the outside side of the square 6 and the internal side of the square 9 (Fig. 1). The concentric portions $ab$ and $cd$ are connected by arcuate curves $ac$ and $bd$ which are tangential to the curve $cd$ and have a radius equal to the chord of the cam quarter $ab$ and struck from the opposite ends of this chord. It will be clear that the radius of the curves $ac$, $bd$ (the chord $ab$) is equal to the internal side of the square frame $6-r_1-r_2$. This enables a value for $x$, the required movement, to be obtained according to the formula $$r_1 = \frac{x}{(2-\sqrt{2})},$$

which fixes all the other dimensions for the cam.

If the cam is now rotated counter-clockwise from the position shown in Fig. 3a about the centre $e$ it will be seen that the concentric surfaces $ab$ and $cd$ will retain the square 6 against any movement up or down along the axis $w$, $w'$, whilst the cam surface $ac$ will move the square to the left along the axis $y$, $y'$. Hence, assuming the square is held against rotation, as it is by its lying against the upper side of the square 9 (Fig. 1) the square 6 is bound to be moved in a perfectly straight line parallel to its sides $fk$ and $gh$ until the cam has completed 90° of revolution. The position is now that shown in Fig. 3b, when the sides $kh$ and $fg$ commence to be tangential to the surfaces $ab$, $cd$ respectively. It will thus be seen that the next 90° of rotation of the cam will move the square downwards, along the axis $w$, $w'$, and at the same time hold it positively against any movement along the axis $y$, $y'$. It needs no further description to explain how the same movement is repeated for the remaining half of the cam revolution. The position of the film claws and frame 5 shown in Fig. 1 is that where they have completed their upward movement and are on the point of commencing the movement to the left. Claw 5a has just passed through slot 1' and entered a perforation in the film on track 1a and claw 5d has just completed the movement of the film on the track 1d. Movement of the frame 5 to the left therefore moves the film along the track 1a without any relative movement between film claw and perforation, withdraws claw 5d from the film on track 1d also without relative longitudinal movement between claw and film, and at the end of the stroke claw 5b enters a perforation of the film on track 1b. Subsequent movement of the film along the tracks 1b, 1c, 1d in succession should be clear from the foregoing description.

In practice, it would be desirable to avoid the sharp corners at $a$ and $b$ which would obviously soon wear off. Fig. 4 shows a modification of the cam for this purpose. It is only necessary to add an equal increment $r_3$ all around the surface, joining the sections at the corners with a radius $r_3$, and to deduct an equivalent amount from each surface of the inside of the square 6.

A reference to Fig. 5 will show the method of driving the cam, the latter being carried by a flange 11a on a shaft 11 mounted in a bearing in the wall 12 across the camera. The shaft is driven by means of a pulley 13 (Figs. 2 and 5) and carries also the sector shutter 14 which is adapted to close each lens in succession over the quarter revolution during which the respective film section is being moved. The apertures in the wall 12 to clear the lenses are indicated at 15 and the lenses are radially arranged in mounts 16 (Fig. 5) and provided with reflecting prisms 17 facing the apertures 15. As shown in Fig. 5 the film tracks 1a etc. and the lens axes are inclined at an angle to a plane across the camera in order that the reflecting prisms 17 may all face the same point at close range, the camera being primarily intended for flat objects at this distance, e. g. X-ray fluorescent screens.

The apparatus is driven by a motor 18 driving a countershaft 19 (Fig. 2) from which are driven either the shutter and cam-driving pulley and the film sprocket and take-up spools, or the reverse wind when the apparatus is used as a projector. These alternative drives are effected with any known clutch arrangement operated by a knob or hand wheel 20 (Fig. 5) which also serves for turning the apparatus by hand when placing the films in position at the various gates. In normal driving position for both taking and projecting the clutch is set to connect shaft 19 to drive the pulley 13, which through gears 21 and 22 and an idler 23 drives the film sprocket 3, from the shaft of which by means of a slip-belt 24 is driven the take-up spool 4. A larger take-up spool 4a driven from the shaft of spool 4 by means of a belt 25 may also be employed for the projection of larger reels. A corresponding large supply spool 2a is also employed and for the reverse wind the spools 2 and 2a are also driven together from the shaft 19 by means of belts 26, 27, this drive being effective when the drive to pulley 13 is declutched and the shaft 19 clutched to the driving pulley of belt 26. Guide pulleys 28 (Fig. 1) are employed to support the long lengths of film when the large spools 2a and 4a are in use, the course of the film in this case being shown by the dotted line F'.

All the above described apparatus is mounted on the cross wall 12 within a square casing 29 provided with a front cover plate 30 having apertures 31 corresponding to the apertures 15 but slightly displaced radially to allow for the axially inclined path of the light as shown in Figs. 5 and 6, and a rear cover plate 32 with a central aperture 33 closed during taking use by a cover 34.

An advantage of the arrangement of lenses which directs the rays radially inwards to the film, is that for projection a single source of illumination can be employed inside the film track, and it is a further feature of the invention to employ a very simple device for reflecting rays from such a source through each film gate in turn. In Fig. 6 a source of illumination is diagrammatically illustrated at 35 outside the case of the apparatus and adjacent the aperture 33 in the rear cover, the cover 34 being removed. A reflecting pyramid 36 is carried by the claw frame 5 and moves with it, each side of the pyramid being parallel with one of the directions of movement. Thus it will be seen that with the parts in the position shown in Fig. 1, the pyramid face 36c will reflect light from the source 35, through the aperture 37 in the track 1c, thence as shown in Fig. 6, and that movement of the pyramid 36 to the left with the frame 5 will not interfere in any way with the direction of this reflection. When the frame 5 reaches its extreme position to the left and commences its downward movement, the pyramid face 36d will then come into play and reflect the light through the film on the track 1d.

The claw carrying frame 5, as it approaches each film gate in turn, may be made to relieve the pressure of the springs on the film, thus leaving the film free for movement, and this further allows of using stronger springs whereby the film is more firmly held. However, such pressure relief may be caused by the shaft for the cam and shutter in any other way, for example by another cam shown at 38 in Figs. 2 and 5.

I claim:—

1. Cinematograph film operating mechanism comprising a plurality of straight film tracks, a film operating claw associated with each track, means for connecting all said claws rigidly together, and means for moving each claw in turn with respect to its associated track perpendicularly thereto for engaging and disengaging with a film perforation without movement in the direction of the track and in a direction parallel with the track without movement transverse to the film.

2. Cinematograph film operating mechanism comprising a plurality of film tracks, a film operating claw associated with each track, a common carrier for all said claws, means for moving said carrier in a square path, and means for confining said claws to paths parallel to the locus of the carrier.

3. Cinematograph apparatus of the type for producing images in succession interspersed along a continuous length of film, comprising in combination a plurality of lenses in ring formation, a film track associated with each lens, means for directing received rays radially inwards towards each film track, a film moving claw associated with each track, a common carrier frame for all said claws, and means for moving said carrier in a path which moves the claws in succession perpendicularly to a film track for insertion and removal from the film perforations and parallel to the film track for moving the film along it.

4. Cinematograph apparatus of the type for producing images in succession interspersed along a continuous length of film, comprising in combination four lenses located around a film track area, a film track associated with each lens said tracks being arranged directionally at right angles, means for leading a film along said tracks in succession, a film moving claw associated with each track, means for connecting all said claws rigidly together, and means for moving said connecting means in a square path, each side of which square is parallel to a film track.

5. Cinematograph apparatus comprising in combination four film tracks located along the sides of a square, means for leading a continuous length of film to said tracks adjacent one corner of the square, then around the square and away adjacent said corner, a lens corresponding to each track with means for directing rays between a direction substantially axial to the apparatus and a direction substantially perpendicular to the film, a film moving claw associated with each track mounted on a carrier common to all, and means for moving said carrier in a square path parallel to the film tracks for engaging a claw with the film on each track in succession.

6. A cinematograph projector of the type for projecting in succession series of images from a continuous length of film, comprising in combination a plurality of lenses in ring formation around a film track area, a film track for each lens located to transmit the film illumination substantially radially outwards from a common axis, means for re-directing said illumination substantially axially to the projector, a source of illumination for all the film tracks located on said common axis, means for directing rays from said source radially outwards through each track in turn comprising a reflecting pyramid having as many sides as there are tracks, means for moving said pyramid around the common axis in a path parallel to its sides, and means for holding said pyramid against rotation about its own axis.

7. A cinematograph projector of the type for projecting in succession series of images from a continuous length of film, comprising in combination four film tracks directionally at right angles located to transmit illumination substantially radially outwards from a common axis within the tracks, a lens for each track, means for directing rays from a film on each track substantially axially to the projector, a source of illumination for all the tracks located on said common axis, means for directing rays from said source radially outwards through each track in turn comprising a square reflecting pyramid with each edge of its base parallel to a track, means for moving said pyramid around the common axis in a square path each side of which is parallel to a track, and means for holding said pyramid against rotation about its own axis.

8. A cinematograph projector of the type for projecting in succession series of images from a continuous length of film, comprising in combination four film tracks directionally at right angles located to transmit illumination substantially radially outwards from a common axis within the tracks, a lens for each track, means for directing rays from a film on each track substantially axially to the projector, a source of illumination for all the tracks located on said common axis, a film moving claw associated with each track, a carrier connecting said claws rigidly together, means for moving said carrier around the common axis in a square path each side of which is parallel to a track, means for holding said carrier against rotation about its own axis, and a square reflecting pyramid located centrally on said carrier with each edge of its base parallel to a track.

BENJAMIN ELLAN LUBOSHEZ.